(12) United States Patent
Shreve et al.

(10) Patent No.: US 9,165,194 B2
(45) Date of Patent: Oct. 20, 2015

(54) HEURISTIC-BASED APPROACH FOR AUTOMATIC PAYMENT GESTURE CLASSIFICATION AND DETECTION

(71) Applicant: Xerox Corporation, Norwalk, CT (US)

(72) Inventors: Matthew Adam Shreve, Tampa, FL (US); Michael C. Mongeon, Walworth, NY (US); Robert P. Loce, Webster, NY (US); Edgar A. Bernal, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 117 days.

(21) Appl. No.: 13/964,652

(22) Filed: Aug. 12, 2013

(65) Prior Publication Data

US 2014/0064566 A1 Mar. 6, 2014

Related U.S. Application Data

(60) Provisional application No. 61/694,650, filed on Aug. 29, 2012.

(51) Int. Cl.
G06K 9/00 (2006.01)
H04N 7/18 (2006.01)
G06Q 20/30 (2012.01)
G06T 7/20 (2006.01)

(52) U.S. Cl.
CPC ........ *G06K 9/00771* (2013.01); *G06K 9/00335* (2013.01); *G06Q 20/30* (2013.01); *G06T 7/2006* (2013.01); *H04N 7/18* (2013.01); *H04N 7/181* (2013.01); *G06T 2207/20112* (2013.01); *G06T 2207/30232* (2013.01)

(58) Field of Classification Search
USPC ......... 382/100, 103, 107, 181, 190, 195, 199, 382/203, 206, 217, 218; 348/135, 169–172
See application file for complete search history.

(56) References Cited

U.S. PATENT DOCUMENTS 5,465,115 A 11/1995 Conrad et al.
5,581,625 A 12/1996 Connell
(Continued)

OTHER PUBLICATIONS

I. Laptev, M. Marszalek, C. Schmid, B. Rozenfeld, "Learning realistic human actions from movies", Computer Society Conference on Computer Vision and Pattern Recognition (*CVPR 2008*), Jun. 24-26, 2008, Anchorage, Alaska, USA, 8 pgs.
(Continued)

*Primary Examiner* — Anand Bhatnagar
(74) *Attorney, Agent, or Firm* — Fay Sharpe LLP

(57) ABSTRACT

A system and method for automatic classification and detection of a payment gesture are disclosed. The method includes obtaining a video stream from a camera placed above at least one region of interest, the region of interest classifying the payment gesture. A background image is generated from the obtained video stream. Motion is estimated in at least two consecutive frames from the video stream. A representation is created from the background image and the estimated motion occurring within the at least one region of interest. The payment gesture is detected based on the representation.

29 Claims, 9 Drawing Sheets

(56) References Cited

U.S. PATENT DOCUMENTS

| | | | |
|---|---|---|---|
| 5,953,055 | A | 9/1999 | Huang et al. |
| 6,195,121 | B1 * | 2/2001 | Huang et al. .................. 348/150 |
| 6,654,047 | B2 | 11/2003 | Iizaka |
| 6,967,674 | B1 * | 11/2005 | Lausch ......................... 348/143 |
| 7,688,349 | B2 | 3/2010 | Flickner et al. |
| 7,909,248 | B1 * | 3/2011 | Goncalves .................... 235/383 |
| 8,478,048 | B2 * | 7/2013 | Ding et al. .................... 382/190 |
| 8,515,813 | B2 * | 8/2013 | Van Buskirk et al. ...... 705/14.69 |
| 8,700,392 | B1 * | 4/2014 | Hart et al. ...................... 704/231 |
| 2002/0194137 | A1 * | 12/2002 | Park et al. ........................ 705/64 |
| 2011/0246329 | A1 * | 10/2011 | Geisner et al. ................ 705/27.1 |
| 2011/0251954 | A1 * | 10/2011 | Chin ................................ 705/40 |
| 2012/0254032 | A1 * | 10/2012 | Carbonell Duque et al. ... 705/44 |
| 2013/0066749 | A1 * | 3/2013 | Cooke et al. ................. 705/27.2 |
| 2013/0218721 | A1 * | 8/2013 | Borhan et al. ............. 705/26.41 |

OTHER PUBLICATIONS

C. Schüldt, I. Laptev, B. Caputo. "Recognizing Human Actions: A Local SVM Approach", 17th International Conference on Pattern Recognition (ICPR '04), Aug. 23-26, 2004, Cambridge, Uk., 5 pgs.

H. Wang, M. Ullah, M. Muhammad, A. Klaser, I. Laptev, C. Schmid. "Evaluation of local spatio-temporal features for action recognition", Paper, US Copyright 2009, 11 pgs.

H. Wang, M. Ullah, M. Muhammad, A. Klaser, I. Laptev, C. Schmid. "Evaluation of local spatio-temporal features for action recognition". Presentation at 20th British Machine Vision Conference (BMVC) London, England, Sep. 7-10, 2009, 33 pgs.

* cited by examiner

HEURISTIC-BASED APPROACH FOR AUTOMATIC PAYMENT GESTURE CLASSIFICATION AND DETECTION

This application claims the priority benefit of U.S. provisional application Ser. No. 61/694,650, filed Aug. 29, 2012, the disclosure of which is incorporated herein by reference in its entirety.

BACKGROUND

The exemplary embodiment relates generally to the detection of payment gestures in surveillance video and finds particular application in connection with a system and method which allows for automatic classification and detection of payment gestures in surveillance video.

Technological advancement and increased availability of surveillance technology over the past few decades has enabled companies to perform new tasks with surveillance video. Generally, companies capture and store video footage of retail settings for their own protection and for the security and protection of employees and customers. However, this video footage has uses beyond security and safety, such as its potential for data-mining and estimating consumer behavior and experience. Analysis of video footage may allow for slight improvements in efficiency or customer experience, which in the aggregate can have a large financial impact. Many retailers provide services that are heavily data driven and therefore have an interest in obtaining numerous customer and store metrics, such as queue lengths, experience time both in-store and for drive-through, specific order timing, order accuracy, and customer response.

Several corporations are patenting retail-setting applications for surveillance video beyond well-known security and safety applications. U.S. Pat. No. 5,465,115, issued Nov. 7, 1995, entitled VIDEO TRAFFIC MONITOR FOR RETAIL ESTABLISHMENTS AND THE LIKE, by Conrad et al., counts detected people and records the count according to the direction of movement of the people. U.S. Pat. No. 5,953,055, issued Sep. 14, 1999, entitled SYSTEM AND METHOD FOR DETECTING AND ANALYZING A QUEUE, by Huang et al., U.S. Pat. No. 5,581,625, issued Dec. 3, 1996, entitled STERIO VISION SYSTEM FOR COUNTING ITEMS IN A QUEUE, by Connel, and U.S. Pat. No. 6,195,121, issued Feb. 27, 2001, entitled SYSTEM AND METHOD FOR DETECTING AND ANALYZING A QUEUE, by Huang et. al, each disclose examples of monitoring queues. U.S. Pat. No. 6,654,047, issued Nov. 25, 2003, entitled METHOD OF AND DEVICE FOR ACQUIRING INFORMATION ON A TRAFFIC LINE OF PERSONS, by Lizaka, monitors groups of people within queues. U.S. Pat. No. 7,688,349, issued Mar. 30, 2010, entitled METHOD OF DETECTING AND TRACKING GROUPS OF PEOPLE, by Flickner et al., monitors various behaviors within a reception setting.

While the above-mentioned patents describe data mining applications related to video monitoring, none of them disclose the detection of payment gestures within a retail or surveillance setting. Data driven retailers are showing increased interest in process-related data from which performance metrics can be extracted. One such performance metric is a customer's total experience time (TET) from which guidelines to improve order efficiency and customer satisfaction can be extracted. While prior art teaches how to estimate important components of the TET estimate such as queue length, no techniques have been disclosed on accurate estimation of payment time, which is a key element in TET measurement. Knowledge of additional information relevant to the payment process such as payment type (e.g. credit, debit or cash) would also be useful in the analysis of TET data. Therefore, there is a need for a system and method that automatically detects and classifies payment gestures in surveillance video.

In general, gesture recognition approaches have been based on modeling human movement. Many approaches use local image and video based approaches, as disclosed in LEARNING REALISTIC HUMAN ACTIONS FROM MOVIES, I. Laptev et al. (CVPR 2008), and RECOGNIZING HUMAN ACTIONS: A Local SVM Approach (ICPR 2004), each of these references describing modeling of the human shape during certain action. More recent approaches have employed space-time feature detectors and descriptors, as disclosed in EVALUATION OF LOCAL SPATIO-TEMPORAL FEATURES FOR ACTION RECOGNITION, by H. Wang et al. (BMVC 2009). These gesture recognition based approaches however have not been applied in the context of surveillance video retail applications, from which payment gestures could be detected.

A system and method for automatically detecting and classifying payment gestures in surveillance video is desired. Successful detection of payment gestures with a facile and low computational cost algorithm may prove to be an effective measure in aiding recent efforts by retailers to encapsulate a customer's experience through performance metrics. The method may focus on algorithmic processing of a video sequence to provide accurate detection of various payment gestures at near real-time speeds.

BRIEF DESCRIPTION

In one aspect of the exemplary embodiment, a method for automatic classification and detection of a payment gesture includes obtaining a video stream from a camera capturing video of at least one region of interest, the region of interest associated with the payment gesture. A background image is generated from the obtained video stream. Motion is estimated in at least two consecutive frames from the video stream. A representation is created from the background image and the estimated motion occurring within the at least one region of interest. The payment gesture is detected and classified based on the representation.

In accordance with another aspect of the exemplary embodiment, a computer program product includes tangible media encoding instructions, which when executed by a computer, perform a method. The method includes generating a background image from a video stream, the video stream capturing data from at least one region of interest classifying a payment gesture. Motion is estimated from N consecutive frames taken from the video stream. A representation is created from the background image and the motion occurring within the at least one region of interest. A payment gesture is detected and classified based on the representation.

In accordance with another aspect of the exemplary embodiment, a system for automatically classifying and detecting a payment gesture includes a video capture unit which streams video from above a region of interest, the region of interest classifying a payment gesture. A video processing module is provided for generating a background image and estimating the motion contained in N consecutive frames from the video steam, wherein the processing module produces a representation based on the dynamic background image and the motion within the region of interest. A detection module is provided for analyzing the representation and determining whether the payment gesture has occurred. A computer processor implements the video capture unit, the video processing module, and the detection module.

DETAILED DESCRIPTION

Figure 1:
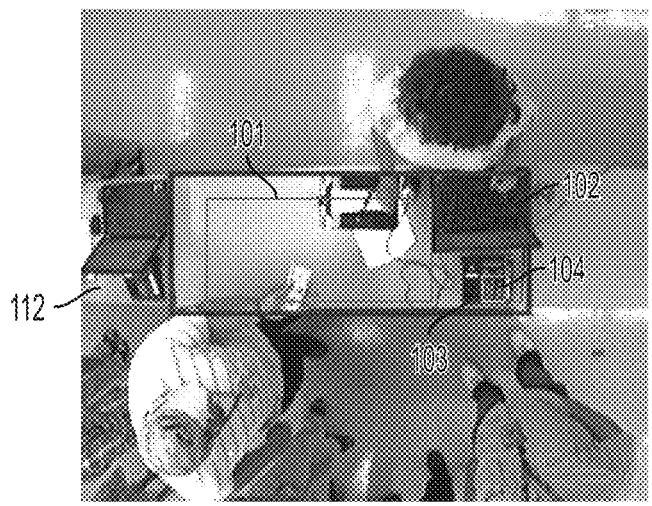
FIG. 1 is a photograph of a payment counter obtained from an overhead surveillance camera. Overlaid on the payment counter are regions of interest, each associated with a different payment gesture.

With reference to FIG. 1, a top-down view of a payment counter 112 is shown with regions of interest 101, 102, 103, 104, indicated over the payment counter 112, each defining an area where one or more payment gestures may be classified and detected. Region of interest 101 is an area for monitoring whether an object has been left behind at the payment counter 112. This may include a cash object, or any other form of payment or commercial instrument, which is left behind on the counter 112. Region of interest 102 is an area for monitoring whether a cash hand-off has occurred, e.g., the customer hands cash directly to the cashier. Region of interest 103 is an area for monitoring whether buttons have been pressed on a credit card machine. Depending on the number of button presses detected in region of interest 103, either a credit card or debit card payment will be detected. Region of interest 104 is an area for monitoring whether a swiping motion has occurred on the credit card machine. Successful detection indicates either a credit or debit card payment.

A video camera 110 (not shown in FIG. 1) is placed above the payment counter (facing down) and records a video stream within a field of view encompassing regions of interest 101, 102, 103, and 104. The video camera 110 may be web-camera or any surveillance camera known to one having ordinary skill in the art. The video camera 110 records video at a set resolution with a particular frame rate, e.g., standard resolution 640×480 at 12 frames per second. Other resolutions and frame rates as known by one having ordinary skill in the art may be implemented to lower the cost of the overall video surveillance setup, or to increase the accuracy of detection. However, if steps are taken to reduce the computational expense of detection later on, increased resolution and/or frame rate of the video stream may not provide much increase in accuracy and may be unnecessary. Frame rates of roughly 12 frames per second are adequate to detect payment gestures in the disclosed exemplary embodiments.

A processor (not shown in FIG. 1) continues to update a background image estimate when no motion is detected over the entire counter 112, or when no motion is detected within a locally defined area of the counter 112. This continuous updating of the background image when there is an absence of motion effectively creates a dynamic background image. An initial background image can be a captured frame of the scene at an instant when no customers or cashiers are present. In cases where these conditions are difficult to capture due to high customer traffic, different segments of the background, e.g. regions of interest 101, 102, 103, 104, can be initialized at different times when local absence of motion is detected during a "motion estimation" stage.

Motion estimation over a predefined area may be performed using a dense optical flow method. Dense optical flow is a standard computer vision technique that tracks all pixels between a pair of temporally consecutive frames. The motion is represented as a matrix of vectors $(u,v)_i$. The Horn-Schunck method may be used, however other optical flow methods known to one having ordinary skill in the art may also be used, such as the Lucas-Kanade and Black flow motion estimation methods. Alternative methods for detecting and estimating motion characteristics include motion detection followed by object tracking and trajectory analysis. However, these alternative methods may be more computationally expensive.

The dynamic background image is updated based on the characteristic of motion found around the counter 112 region. For example, if the magnitude or length of the motion vectors in region of interest 102 is smaller than a threshold for more than a predetermined number of consecutive frames N, as determined by Equation (1):

$$\sum_{ROI2} |(u, v)_i| < T_{BG} \qquad \text{Equation (1)}$$

then the background model is updated and set to the current frame. In this case, $T_{BG}$ is the maximum amount of total motion, for N frames. In one implementation of the algorithm, N and $T_{BG}$ in Equation (1) may be N=5 and $T_{BG}$=40. The values for these parameters depend on the camera parameters as well as on the frame rate and resolution of the acquired video.

For each frame in the video stream, a binary image $I_{bin}$ is generated that segments the background from the foreground using a standard background subtraction technique, as illustrated by Equation (2):

$$I_{bin}(x, y) = \begin{cases} 1 & I(x, y) - BG(x, y) > T_{Bin} \\ 0 & \text{otherwise} \end{cases} \qquad \text{Equation (2)}$$

where I is the current frame converted to grayscale, BG is the current background image, and $T_{Bin}$ is a threshold between 0 and 255. In an exemplary embodiment of the algorithm, $T_{Bin}$=25. This threshold will depend on the illumination and contrast conditions of the scene, as well as on the color response and dynamic range of the camera.

Figure 2:
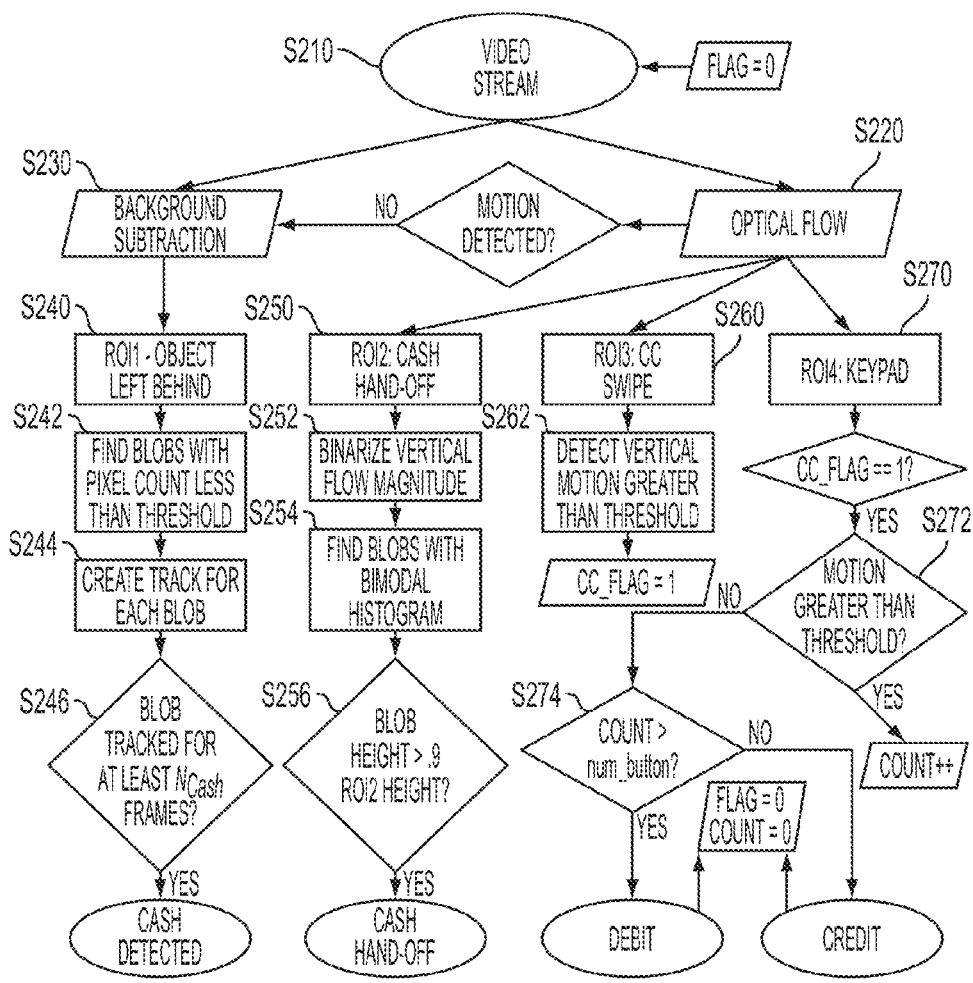
FIG. 2 is a flowchart diagram illustrating a method for automatic classification and detection of a payment gesture in accordance with one aspect of the exemplary embodiment.

With reference to FIG. 2, a flowchart of a method for automatically classifying and detecting a payment gesture is indicated. The method is an algorithmic method that does not require any special equipment except for a webcam or other surveillance camera 110 that acquires a view of the payment counter 112. The method operates in near real-time speeds. The method begins at S210, and with additional reference to FIG. 1, a video stream is obtained from the video camera 110, that for example, faces downward upon regions of interest 101, 102, 103, 104. Subsequently at S220, the video stream is processed by extracting an initial background image frame, as well as extracting the next sequential pair and/or consecutive additional frames N for the purpose of estimating motion. A frame from the video stream without a customer or cashier present is extracted and used to initialize the background image. Subsequent frames are extracted and processed to estimate motion using an estimation technique such as optical flow to obtain a motion vector for each or some subset of pixels in the image pair. If no motion is detected in the sequential pair of frames or a predefined number of consecutive additional frames N as determined by Equation (1), the background image is updated to reflect the most current frame.

At S230, background subtraction is performed to segment a foreground image from the background image by Equation (2). The output of this segmentation is a binary image, $I_{bin}$ wherein pixel locations with values equal to 1 denote a foreground image and pixel locations with values equal to 0 denote a background image. The binary image is further analyzed in distinct ways depending upon which region of interest 101, 102, 103, 104 (and therefore which type of payment gesture) is focused upon.

For detection of objects left behind on a payment counter 112, such as a cash payment, the binary image created within region of interest 101 is analyzed at S240. At S240, image blobs are generated from the binary image obtained at S230, within region of interest 101, using connected component analysis labeling. At S242, blobs are found with a pixel count less than a threshold value. In particular, an aspect ratio of the blobs and the total number of pixels in the foreground image (that is, pixels with value equal to 1) are used to detect cash payments and distinguish them from other objects. Blob aspect ratio constraints and pixel constraints can be determined heuristically by calculations using average values found from observed cash.

Each cash payment object detected at S242 is given a new track ID at S244, unless it has significant overlap with a previously detected payment object. In this case, a counter associated with an existing track ID that matches it is incremented. If at S246 the counter is greater than $N_{Cash}$, a cash payment is detected and the corresponding region in the binary image, $I_{Cash}$, is cropped from $I_{bin}$. $I_{Cash}$ is then compared with the same location in all future frames of the video stream until it is removed. To detect when the cash is removed, a binary image is created by Equation (2), for the $I_{Cash}$ region. If more than a threshold number of pixels, $T_{Rem}$, within binary image region $I_{Cash}$ are 1, then the cash has been removed. In the exemplary embodiment, $N_{cash}$ and $T_{rem}$ may be equal to 3 and 30%, respectively. These parameters will depend on the camera resolution and geometric setup, as well as on its frame rate.

While cash payment detection as described above is performed on binary images for the benefit of computational efficiency, other implementations that perform grayscale or color image analysis (e.g. texture and color analysis) may alternatively be used. Significant gains in computational efficiency can be achieved by processing the locations of the captured video frame indexed by the binary image only.

For detecting whether an object hand-off has occurred over the payment counter 112, e.g., a cash-payment handoff, a binary image created within region of interest 102 and analyzed at S250. Similar to S240-S246, connected component analysis is used to label blobs generated from a binary image produced by Equation (2). However, unlike S240-246, optical flow data analysis is also required for activity recognition when detecting an object hand-off, and for credit/debit payment detection later described at S260-S274.

At S252, vertical flow is measured within region of interest 102. The vertical component of the optical flow vector field is also binarized into a vertical flow binary image. At S254, a 2-bin positive/negative vertical motion histogram is calculated for the segmented motion represented by the binarized image. Each frame for the vertical motion v within the region of interest 102 is included in the calculation. At S256, blobs are identified in the binary image with a height greater than a predefined threshold percent, H, of the height of region of interest 102, e.g., 90%. If a blob has both a height greater than a predefined threshold percent, H, of the height of region of interest 102 (S256), and a bimodal vertical motion of magnitude $T_{bin}$, which is greater than a defined threshold $T_{hand}$, a cash hand-off payment is detected. In the exemplary embodiment, H, $T_{bin}$ and $T_{hand}$ may be equal to 90%, 0.2, and 100, respectively. These parameters may vary depending on the geometric setup of the camera, as well as on the spatial resolution of the video.

For detection of object hand-offs which are not cash, different $T_{bin}$ and $T_{object}$ thresholds may be defined which match the vertical motion profile (positive/negative) of the object to be identified within region of interest 102 (S252-S256). Furthermore, the defined threshold percent, H, of the height of region of interest 102 in step 252 may also be altered to reflect the physical characteristics of the item to be handed off within region of interest 102, e.g. lowered H threshold due to the smaller size of a business card relative to cash. For detecting whether a debit or credit card has been swiped in a credit card machine, a binary image created within region of interest 104 by Equation (2) is analyzed at S260. At S262, a two-bin histogram (positive/negative) is calculated for each frame for which vertical motion occurs within region of interest 104. Two thresholds of vertical motion, $T_{cc1}$ and $T_{cc2}$, are used to determine when a swipe occurs. The first threshold, $T_{cc1}$, is used to ensure that vertical motion in the downward direction is large enough, and the second threshold, $T_{cc2}$, is used to ensure that vertical motion in the upward direction is minimal. When a swipe is detected, a CC_FLAG is set to 1, which then allows the credit card machine button region of interest 103 to be analyzed at S270. In the exemplary embodiment, $T_{cc1}$ and $T_{cc2}$ may be equal to 40 and 20, respectively. These thresholds will vary depending on the frame rate and resolution of the video, as well as on the geometric setup of the camera.

At S270, the binary image created within region of interest 103 by Equation (2) is analyzed. To avoid needless computation when detection is unlikely under the circumstances, S270 is executable only if the CC_FLAG is set to 1. Therefore, S270 cannot be performed if the CC_FLAG equals 0. At S272, motion (e.g., button pressing) on the credit card button panel region of interest 103 is detected if more than $T_{cc3}$ pixels are equal to 1 on a generated binary image. For each button press event detected, a counter num_button is incremented. When no button pressing has been detected for at least $N_{cc}$ frames, num_button is used to determine if it was a credit card payment or debit card payment. If num_button>$N_B$, then at S274 a debit card payment is detected. If num_button<$N_B$, a credit card payment is detected. Credit card payments generally involve fewer button press events than debit card payments, which require the entry of a debit card authorization code.

While S252-S274 propose the use of optical flow data analysis for activity recognition, other motion analysis techniques such as object tracking followed by trajectory analysis can alternatively be used for increased accuracy of payment gesture recognition. However, these alternatives may be more computationally expensive.

In another aspect of the exemplary method, a computer program product is used to perform a method of payment gesture classification and detection. The computer program product includes tangible media encoding instructions, which may be executed by a computer to perform the method. The method includes generating a background image from a video stream, the video stream capturing data from at least one region of interest classifying a payment gesture, estimating the motion contained in N consecutive frames taken from the video stream, creating a representation from the background image and the motion occurring within the at least one region of interest, and detecting the payment gesture based on the representation.

In yet another aspect of the exemplary method, a system for automatically classifying and detecting a payment gesture includes a video capture unit which streams video from a region of interest, the region of interest classifying a payment gesture. A video processing module is provided for generating a background image and estimating the motion contained in N consecutive frames from the video steam, wherein the processing module produces a representation based on the dynamic background image and the motion within the region of interest. A detection module is provided for analyzing the representation and determining whether the payment gesture has occurred. A computer processor implements the video capture unit, the video processing module, and the detection module.

The following examples are for purposes of further illustrating the present disclosure. The examples are merely illustrative and are not intended to limit processes or devices made in accordance with the disclosure to the materials, conditions, or process parameters set forth therein.

Example 1

Figure 3B:
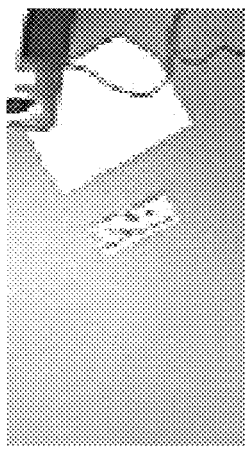
FIG. 3 is a collection of data from an example setup for detecting cash left on a payment counter. Included is (a) an example overhead frame with cash left on a payment table, (b) a region of interest for classifying a cash left on table payment, and (c) a corresponding segmented binary image representation.
Figure 3C:
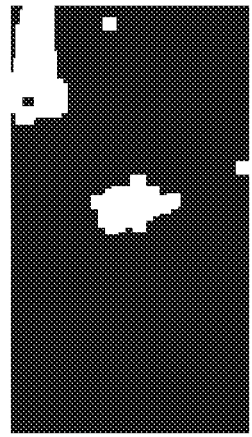
Figure 3A:
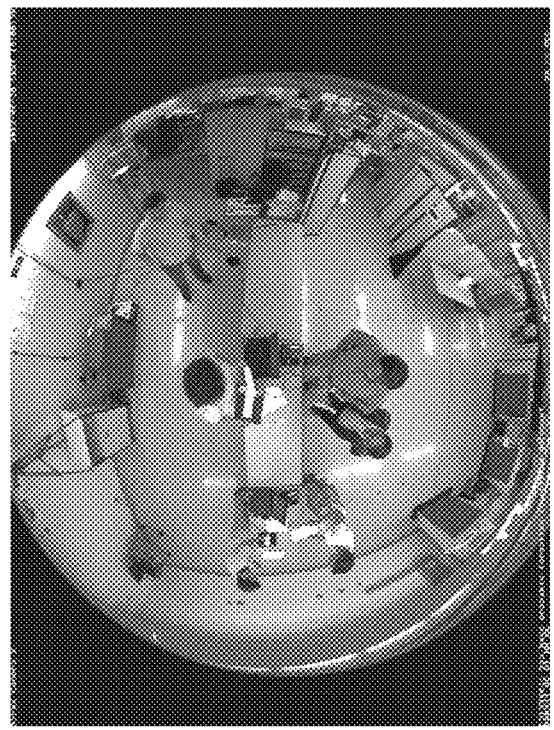
Figure 4A:
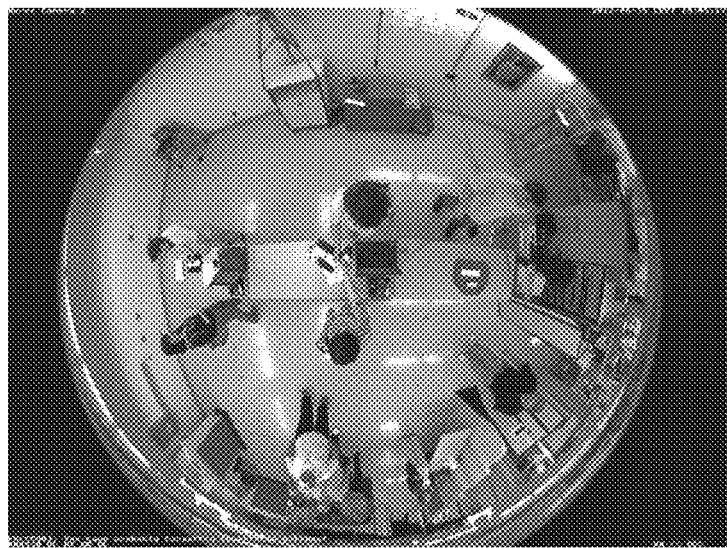
FIG. 4 is a collection of data from an example setup for detecting a cash object hand-off. Included is (a) an example overhead frame with a cash hand-off payment, (b) a region of interest for classifying a cash hand-off payment gesture, (c) a corresponding diagram of the vertical component of the optical flow vector field, (d) a corresponding binarized flow diagram, and (e) a corresponding 2-bin positive/negative histogram for segmented motion.
Figure 4B:
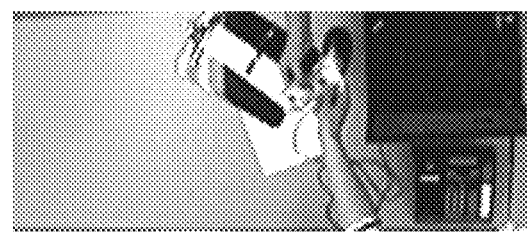
Figure 4C:
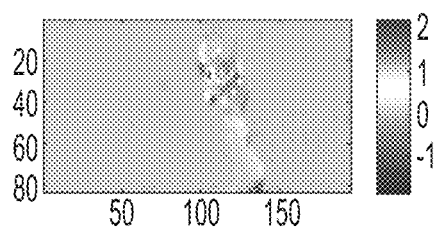
Figure 4D:
Figure 4E:
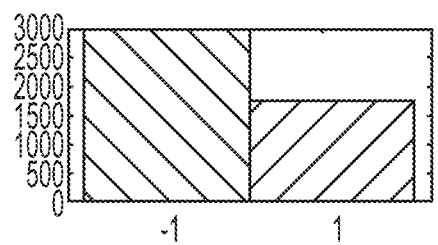
Figure 5A:
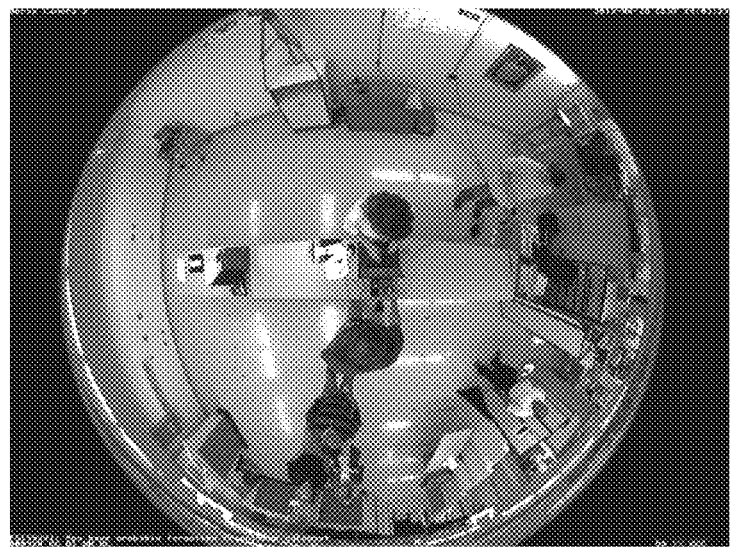
FIG. 5 is a collection of data from an example setup for detecting a credit card or debit card swipe. Included is (a) an example overhead frame with a card swipe, (b) a region of interest for classifying a credit card or debit card payment gesture, (c) a corresponding diagram of the vertical component of the optical flow vector field, and (d) a corresponding 2-bin positive/negative histogram for segmented motion.
Figure 5B:
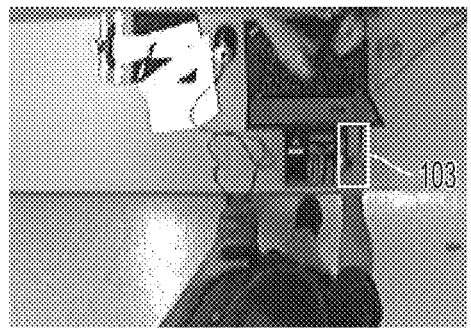
Figure 5C:
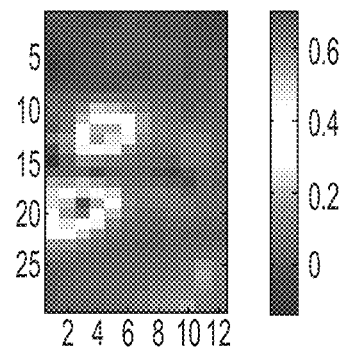
Figure 5D:
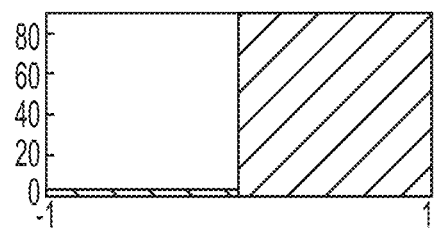
Figure 6A:
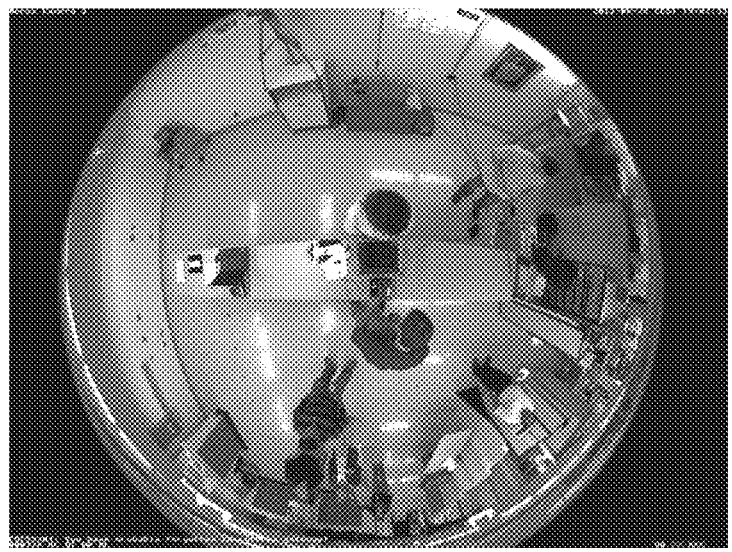
FIG. 6 is a collection of data from an example setup for detecting a credit card or debit card button pressing. Included is (a) an example overhead frame with a button pressing event, (b) a region of interest for classifying a credit card or debit card button pressing, (c) a corresponding diagram of the vertical component of the optical flow vector field, and (d) a corresponding binarized flow diagram.
Figure 6B:
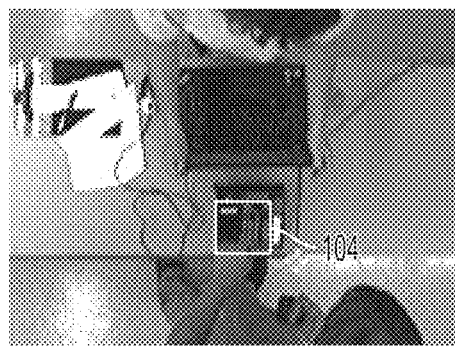
Figure 6C:
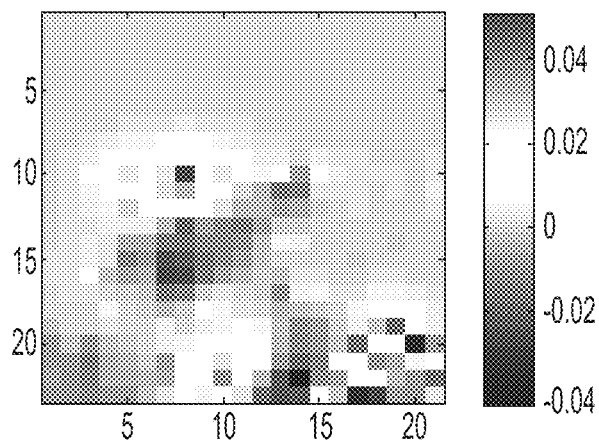
Figure 6D:
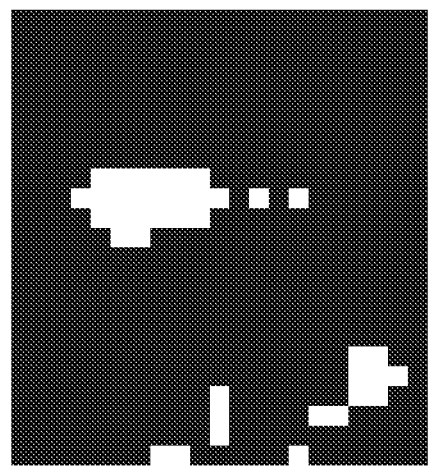

With reference to FIG. 3, an exemplary setup for the automatic classification and detection of a cash object which has been left behind on a payment counter 112 is demonstrated. An example frame containing cash left on the payment counter 112 has been captured by an overhead surveillance camera in FIG. 3(a). Region of Interest 101 is shown in FIG. 3(b), with a corresponding background segmented binary image shown in FIG. 3(c). The binary image was generated by the background subtraction technique described in Equation (1). In order to detect cash that has been left on the payment table 112, image blobs have been generated from the binary image within the region of interest 101, using connected component analysis labeling. Blob aspect ratio and the total number of foreground pixels, which are heuristically determined constraints, were used to distinguish cash payments from other objects. Each cash payment object detected to have been left behind was given a new track ID, unless it has significant overlap with a previously detected payment object.

In this exemplary setup shown in FIG. 3, a cash payment left on the payment counter 112 was successfully classified and detected. The cash payment counter, which is incremented when new track IDs are assigned, above threshold $N_{cash}$. In exemplary setup described above in FIG. 3, $N_{cash}$=3.

Example 2

With reference to FIG. 4, an exemplary setup for the automatic classification and detection of a cash payment hand-off is demonstrated. A cash payment hand-off refers to when the customer directly hands the cash to the cashier, or vice-versa. An example frame containing a cash hand-off between customer and cashier has been captured by an overhead surveillance camera in FIG. 4(a). Region of interest 102 is shown in FIG. 4(b), with a corresponding vertical flow diagram shown in FIG. 4(c). The cash hand-off gesture, unlike the cash left-behind gesture example shown in FIG. 3, requires analyzing the optical flow within the region of interest 102 to estimate activity or motion. The motion (uv) within region of interest 102 is binarized via thresholding operations on the lengths of the motion vectors to form the corresponding binarized flow diagram, $F_{Bin}$, shown in FIG. 4(d). Connected component analysis was then used to label blobs in the binary image $F_{bin}$. When a blob is found that has a height greater than 90% of the height of region of interest 102, a two-bin (positive, negative) histogram of the vertical motion found for the pixels contained in the blob is created and analyzed. The corresponding two-bin histogram is shown in FIG. 4(e). If the values of both bins, with magnitude represented by $T_{bin}$, are greater than $T_{hand}$, then a cash hand-off payment is detected. In the exemplary setup described above in FIG. 4, $T_{bin}$=0.2 and $T_{hand}$=100.

Example 3

With reference to FIG. 5, an exemplary setup for the automatic classification and detection of a credit card or debit card swipe is demonstrated. An example frame containing a debit card swipe has been captured by an overhead surveillance camera in FIG. 5(a). Region of interest 104 is shown in FIG. 5(b). The vertical motion in region of interest 104 is used to determine when a credit or debit card swipe has occurred. This vertical motion is shown as a vertical flow diagram in FIG. 5(c), and a corresponding two-bin histogram (positive, negative) calculated for each frame of vertical motion v within region of interest 104 is shown in FIG. 5(d). Two thresholds were used to determine when a swipe occurs. The first threshold, $T_{cc1}$, was used to ensure that the vertical motion in the downward direction is large enough. The second threshold, $T_{cc2}$, was used to ensure that the upward motion is minimal. If the number of downward motion vectors as indicated by the 2-bin histogram is larger than $T_{cc1}$, and the number of upward motion vectors is smaller than $T_{cc2}$, then a swipe is detected. In the exemplary embodiment, $T_{cc1}$=40 and $T_{cc2}$=20. When a swipe is detected, a CC_FLAG is set to 1. This allows for the credit card machine button region of interest 103 to be analyzed, as shown in Example 4 below.

Example 4

With reference to FIG. 6, an exemplary setup for the automatic classification and detection of a credit card or debit card payment through button press events is demonstrated. An example frame containing a credit card machine number pad, and a customer pressing the pad, has been captured by an overhead surveillance camera in FIG. 6(a). Region of interest 103 is shown in FIG. 6(b). The vertical flow contained in region of interest 103 is shown as a vertical flow diagram in FIG. 6(c), with a corresponding binarized flow diagram, $F_{Bin}$, shown in FIG. 6(d). Since the CC_FLAG in this example is currently set to 1, motion has been binarized to obtain $F_{bin}$.

If more than $T_{cc3}$ pixels are 1, then motion is detected therefore button pressing has been detected. For each button press event detected, a counter num_button is incremented. When no button pressing has been detected for at least $N_{cc}$ frames, num_button is used to determine if it was a credit card payment or debit card payment. If num_button>$N_B$, then a debit card payment was detected. Otherwise, it is a credit card payment. In the exemplary example shown in FIG. 6, $T_{button}$==50, $N_{cc}$=100, and $N_B$ 10. Since $T_{button}$>$N_B$, a debit card payment has been detected.

Example 5

The results provided in TABLE 1 reflect a dataset consisting of 33 test sequences. During each test sequence, a single payment gesture was shown.

TABLE 1

|  | Cash-hand | Cash-table | Credit | Debit |
| --- | --- | --- | --- | --- |
| Cash-hand | 14 | 1 |  |  |
| Cash-table |  | 2 |  |  |
| Credit |  |  | 3 | 1 |
| Debit |  |  | 2 | 5 |
| Total Detected: | 14 | 3 | 5 | 6 |
| Total Gestures: | 17 | 3 | 6 | 7 |

Each sequence indicated above involved an overhead view of a customer purchasing a food item at a payment counter. Overall, 29 out of 33 payments were detected. For the cash-hand gesture, e.g. customer hands the cash to cashier, 14 out of 17 were correctly classified, while three cash-hand gestures were missed. For the cash-table payment gesture, e.g. customer leaves cash on the payment counter, 2 out of 3 of these gestures were correctly classified, while one was incorrectly identified as a cash-hand gesture. For the credit card payment gesture, 3 out of 6 were correctly classified, while 2 were incorrectly identified as debit payment and one was missed. For the debit payment gesture, 5 out of 7 were correctly identified, while one was incorrectly identified as a credit card payment, and one was missed.

Accuracy of the system and method for automatic payment gesture classification and detection may be improved by replacing the binary images and two-bin histograms shown in Examples 1-4 with greater resolution images, e.g. grayscale or color at higher resolution and motion histograms with larger numbers of bins. However, with this increased accuracy will also come additional computational expense. Binary images were used in Examples 1-4 to provide a computationally efficient algorithm that could be easily adopted in retail settings, and which could provide a fairly reliable classification and detection rate of payment gestures.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for automatic classification and detection of a payment gesture, comprising:
   obtaining a video stream from a camera capturing video from at least one region of interest, the region of interest associated with the type of payment gesture;
   detecting motion within the at least one region of interest;
   creating a representation of the motion occurring within the at least one region of interest; and
   detecting the payment gesture based on the representation.

2. The method of claim 1, wherein the detecting motion within the at least one region of interest is achieved by one of temporal frame differencing, background estimation and subtraction, optical flow, and frame differencing.

3. The method of claim 2, wherein the background estimation includes regenerating the background image when the motion contained in the at least two consecutive frames from the video stream is less than a threshold value, T.

4. The method of claim 2, wherein the optical flow technique is implemented through at least one of the Horn-Schunck, Lucas-Kanade, and Black flow method.

5. The method of claim 1, wherein the at least one region of interest is associated with one of an object hand-off, cash payment object left behind, debit card payment, and credit card payment gesture.

6. The method of claim 1, wherein the representation is one of a binary image, a histogram of motion vectors, and a set of spatio-temporal coordinates representing the trajectory of an object in motion.

7. The method of claim 6, wherein the representation includes a two-bin histogram indicating vertical motion, and the detecting the payment gesture based on the representation further includes determining whether the length of the vertical motion vectors is larger than a maximum threshold, $T_{hand}$.

8. The method of claim 1, wherein the detecting the payment gesture based on the representation further includes determining whether the magnitude of the vertical motion is greater than a downward threshold, $T_{cc1}$.

9. The method of claim 8, wherein the detecting the payment gesture based on the representation further includes determining whether the magnitude of the vertical motion is greater than an upward threshold, $T_{cc2}$.

10. The method of claim 1, wherein the at least one region of interest is associated with a credit card payment gesture and encompasses a swipe portion of a credit card machine.

11. The method of claim 10, further including setting a flag equal to 1 after detection of the credit card payment gesture, the flag allowing for detection of the at least one payment gesture within a different region of interest.

12. The method of claim 1, wherein the at least one region of interest is associated with a cash hand-off payment gesture and encompasses a payment counter.

13. The method of claim 12, wherein the representation includes a binary image and the detecting the payment gesture further includes determining whether a blob from the binary image has a height greater than a threshold, H.

14. The method of claim 12, wherein the threshold, H, is defined by the height of the at least one region of interest.

15. The method of claim 1, wherein the at least one region of interest classifies a debit card payment gesture and encompasses a number pad portion of a credit card machine.

16. The method of claim 15, wherein the representation includes a binary image and the detecting the payment gesture further includes determining whether a button pressing event has occurred.

17. The method of claim 16, wherein the detecting the payment gesture further includes a counter, num_button, the counter incremented for each button pressing event which has occurred.

18. The method of claim 17, wherein the detecting further includes determining whether the counter, num_button, is greater than a threshold value, $N_B$.

19. The method of claim 15, wherein the button pressing event has occurred if more than a threshold, $T_{cc3}$, number of pixels in the binary image are equal to 1.

20. A computer program product comprising non-transitory tangible media encoding instructions, which when executed by a computer, perform a method comprising:
  generating a background image from a video stream, the video stream capturing data from at least one region of interest classifying a payment gesture;
  estimating the motion contained in N consecutive frames taken from the video stream;
  creating a representation from the motion occurring within the at least one region of interest; and
  detecting the payment gesture based on the representation.

21. The method of claim 20, wherein the representation is a binary image.

22. The method of claim 20, wherein the representation is at least one of a grayscale and color image.

23. The method of claim 20, wherein the representation is a two-bin histogram indicating vertical motion.

24. The method of claim 20, wherein the estimating the motion contained in N consecutive frames taken from the video stream is performed by optical flow.

25. The method of claim 20, wherein the estimating the motion contained in N consecutive frames taken from the video stream is performed by object tracking and trajectory analysis.

26. A system for automatically classifying and detecting a payment gesture, comprising:
  a video capture unit which streams video from above a region of interest, the region of interest classifying a payment gesture;
  a video processing module for generating a background image and estimating the motion contained in N consecutive frames from the video steam, wherein the processing module produces a representation based on the dynamic background image and the motion within the region of interest;
  a detection module for analyzing the representation and determining whether the payment gesture has occurred; and
  a computer processor which implements the video capture unit, the video processing module, and the detection module.

27. The system according to claim 26, wherein the video processing module generates a dynamic background image that is updated with a current frame of the video stream when the motion contained in the region of interest is less than a threshold value for N consecutive frames.

28. The system according to claim 26, wherein the detection module determines whether vertical motion indicated by the representation is above a threshold value.

29. The system according to claim 26, wherein the detection module performs connected component analysis to label a plurality of blobs contained in the representation.

* * * * *